NOAH ROGERS.
Improvement in Fire Kindlers.

No. 120,898. Patented Nov. 14, 1871.

Witnesses:
E. Wolff.
Gustave Dieterich.

Inventor:
Noah Rogers
per Munn & Co.
Attorneys.

120,898

UNITED STATES PATENT OFFICE.

NOAH ROGERS, OF THOMASVILLE, GEORGIA, ASSIGNOR TO WILLIAM H. ROGERS.

IMPROVEMENT IN FIRE-KINDLERS.

Specification forming part of Letters Patent No. 120,898, dated November 14, 1871.

*To all whom it may concern:*

Be it known that I, NOAH ROGERS, of Thomasville, in the county of Thomas and State of Georgia, have invented a new and useful Improvement in Automatic Fire-Kindler; and I do hereby declare that the following is a full, clear, and exact description thereof, which will enable others skilled in the art to make and use the same, reference being had to the accompanying drawing forming part of this specification, in which—

Figure 1:
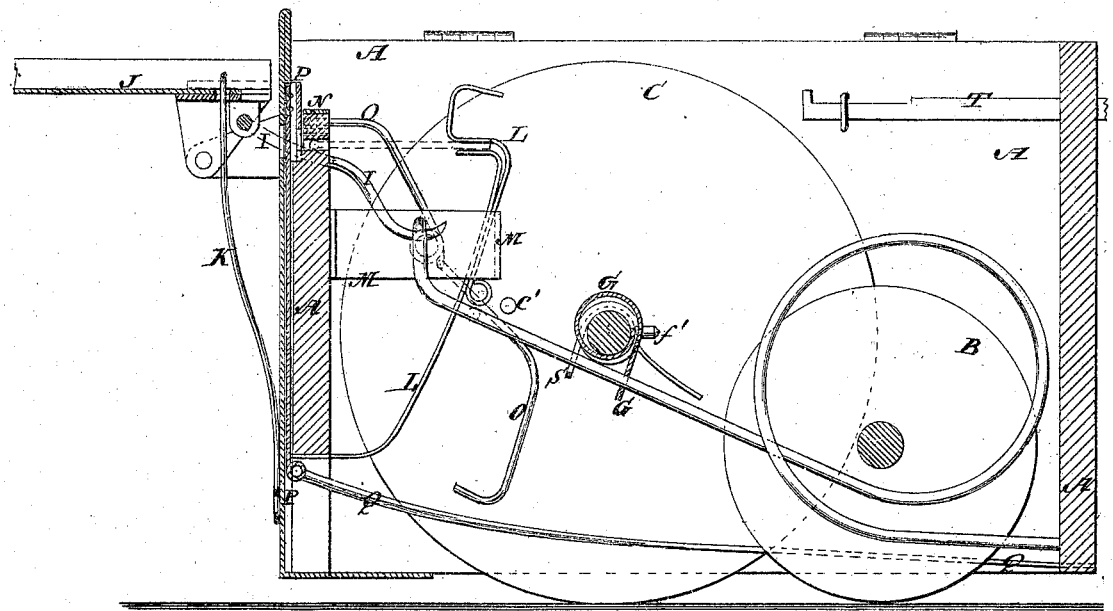
Figure 2:
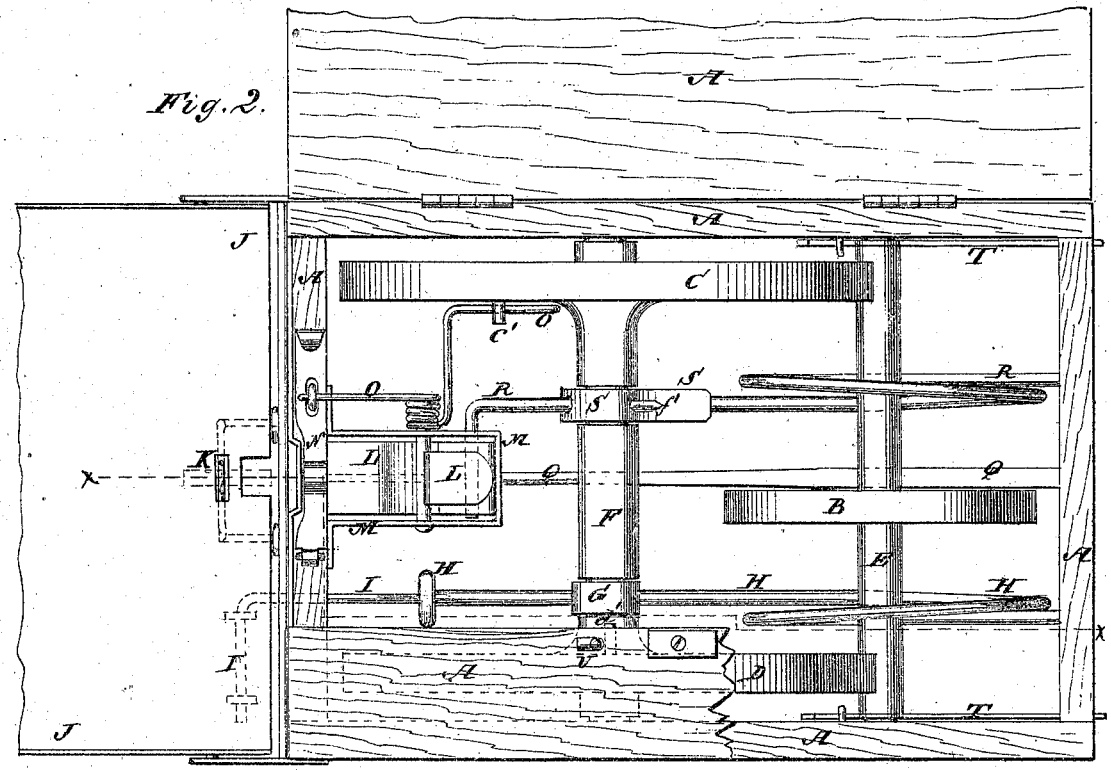

Figure 1 is a vertical longitudinal section of my improved machine taken through the line *x x*, Fig. 2. Fig. 2 is a top view of the same with the cover raised, and with parts broken away to show the construction.

Similar letters of reference indicate corresponding parts.

My invention has for its object to furnish an improved machine which shall be so constructed as to enable the fire to be kindled by any one in another part of the house, and without getting out of bed; and it consists in the construction and combination of the various parts of the machine, as hereinafter more fully described.

A is the box of the machine, the forward end of which is formed of or plated with metal to prevent it from being set on fire. The box A is made with an open bottom, and with its top partly stationary and partly hinged to give convenient access to the interior. The box A runs upon three wheels, B C D. The rear wheel B is made small, and may run loosely upon or be rigidly connected with the middle part of the axle E, the ends of which are connected with the rear part of the sides of the box A. The forward wheels C D are made large, and are rigidly connected with the axle F near its ends. The journals of the axle F revolve in bearings in the sides of the box A. To the axle F, near the wheel D, is attached one end of a leather strap, G, through the other end of which passes the spring H, so that when the machine is run forward the strap G will be wound upon the axle F and will draw the spring H up to said axle. The rear end of the spring H is attached to the rear end of the box A, and its forward end is bent upward, and has an eye formed upon it to receive the rear end of the rod or lever I, which passes through a hole in the front end of the box A, and the foward end of which is pivoted to the apron J, which is pivoted to the forward end of the box A, and which is designed to receive the kindling. K is a wire loop, the ends of which are attached to the lower part of the forward end of the box A, and which passes up through a short transverse slot in the apron J, near its inner edge, to receive a light wood splinter to support the apron J when the lever I is released from the spring H, and which, when burnt off, allows the apron J to fall, discharging the burning kindling into the fire-place to kindle the fire. L is a spring, the lower end of which is attached to the inner side of the forward end of the box A, and the movement of which is limited by the guard M attached to the forward end of the box A. Upon the upper end of the spring L are formed spring-jaws to receive the rear end of a match, which rests in a recess in the upper edge of the box A, where it is secured in place by a pivoted jaw, N. The recess and the jaw N are lined with leather, rubber, cork, or other suitable material, to adapt them for holding the match securely without danger of igniting it, and especially to protect the head of the match from dampness. The movable jaw N has a slot formed through its free end to receive a staple attached to the upper edge of the front end of the box A, where it is secured in place by the end of the wire rod O, which is pivoted to the guard M, and the lower end of which projects downward so as to be struck by a pin, *c'*, attached to the side of the wheel C, to release the jaw N and allow the match to be pushed forward at the proper time by the spring L. The head of the match rests against a plate, P, inserted in a recess between the forward end of a box, A, and the metallic facing upon said end. The plate P should be corrugated, toothed, or otherwise roughened, so that it may ignite the match by being drawn across its end. The plate P is held up so as to cover the hole in the end of the box A, and so that the head of the match may rest against it by the spring Q, the forward end of which is connected with the lower end of the said plate, and the rear end of which is attached to the rear end of the box A. R is a spring, the rear end of which is attached to the rear end of the box A, and the forward end of which is bent to one side, so as when the said spring R is released to strike against the spring Q, forcing it downward, and drawing the plate P down to ignite the match and allow it to be forced outward through the hole in the front end of the box and set fire to the kindling upon the apron J. S is a leather strap through a hole, in one end of which the spring R passes, and which has a hole formed in it to receive a pin, $f'$, attached to the axle F, so that the spring R may be raised from the spring Q by the backward movement of the machine. T is a slide connected with the rear end of the box A, and which is designed to be drawn out to receive weights to balance the weight of the kindlings placed upon the apron J.

In arranging the machine for use, it is rolled forward, which winds the strap G upon the axle F and raises the spring H to said axle. The apron J is then raised, the inner end of the lever I entering the eye of the said spring H. A splinter is then passed through the loop K above the apron J, and other kindlings are placed above and around it upon the apron J. The strap S is then passed over the pin $f'$, and the machine rolled backward until the spring R is drawn up to the axle F. The hook-pin $v$ is then passed through a hole in the stationary part of the top of the box A in such a position as to be struck by a pin, $d'$, attached to the wheel D, which locks the machine until released by withdrawing the said pin $v$. A match is then inserted in the jaws of the spring L, and is secured by the jaw or clamp N, with its head resting against the plate P. The machine is then placed at the proper distance in front of the fire-place; then, by withdrawing the pin $v$ the machine will run forward to the fire-place, and at the same time will ignite the match and set fire to the kindlings upon the apron J. As the splinter in the loop K burns off the apron J will drop, discharging the burning kindlings into the fire-place and starting the fire. The dropping of the apron J releases the spring H, which at once operates to draw the machine back from the fire. The pin $v$ is designed to be hooked upon a loop in the end of a cord which runs through loops or rings attached to the ceiling, and through holes in the partition, until it is brought into every or any room of the house, and should terminate near the head-post of the bedstead, so that it can be readily operated to withdraw the pin $v$ without getting out of bed.

Having thus described my invention, I claim as new and desire to secure by Letters Patent—

The combination of the box A, wheels B C D, axles E F, strap G, spring H, rod or lever I, pivoted apron J, loop K, spring L, guard M, movable jaw or clamp N, pivoted rod O, sliding plate P, spring Q, spring R, strap S, pins $f'$ $c'$ $d'$, and locking-pin $v$ with each other, substantially as herein shown and described, and for the purpose set forth.

NOAH ROGERS.

Witnesses:
WM. POWELL,
B. F. POWELL,
W. G. LEWIS.